(12) United States Patent
Maruyama et al.

(10) Patent No.: US 8,782,806 B2
(45) Date of Patent: Jul. 15, 2014

(54) CONTENT USAGE MANAGING APPARATUS, CONTENT USAGE MANAGING METHOD AND PROGRAM

(75) Inventors: Tetsuo Maruyama, Tokyo (JP); Tetsu Sumita, Tokyo (JP); Tomoki Shirakawa, Kanagawa (JP)

(73) Assignees: Sony Corporation (JP); Plat-Ease Corporation (JP)

( * ) Notice: Subject to any disclaimer, the term of this patent is extended or adjusted under 35 U.S.C. 154(b) by 704 days.

(21) Appl. No.: 12/655,171

(22) Filed: Dec. 22, 2009

(65) Prior Publication Data

US 2010/0169978 A1  Jul. 1, 2010

(30) Foreign Application Priority Data

Dec. 25, 2008 (JP) ................................ 2008-331222

(51) Int. Cl.
*H04L 29/06* (2006.01)
*G06F 17/30* (2006.01)
*H04L 29/08* (2006.01)

(52) U.S. Cl.
CPC ............... *G06H 21/10* (2013.01); *H04L 63/12* (2013.01); *G06F 17/30876* (2013.01); *H04L 67/02* (2013.01)
USPC ........................................................ 726/30

(58) Field of Classification Search
CPC ... G06F 17/30876; G06F 21/10; H04L 63/12; H04L 67/02; H04L 63/0272; H04L 65/403; H04L 63/101; H04L 63/0823; H04L 2463/101; H04L 2463/103; G06Q 10/10; G06Q 30/0601

USPC .......................................... 726/26–27, 30–32
See application file for complete search history.

(56) References Cited

U.S. PATENT DOCUMENTS

| 6,405,203 B1 * | 6/2002 | Collart ........................... 382/205 |
| 7,426,750 B2 * | 9/2008 | Cooper et al. .................. 726/26 |

(Continued)

FOREIGN PATENT DOCUMENTS

| JP | 8-292961 | 11/1996 |
| JP | 2000330873 A | 11/2000 |

(Continued)

OTHER PUBLICATIONS

Office Action from Japanese Application No. 2008-331222, dated Feb. 5, 2013.

*Primary Examiner* — Darren B Schwartz
*Assistant Examiner* — John B King
(74) *Attorney, Agent, or Firm* — Lerner, David, Littenberg, Krumholz & Mentlik, LLP

(57) ABSTRACT

There is provided a content usage managing apparatus including a memory unit to store the first relation between a POP and one or more contents included in the POP and the second relation between the POPs linked via a content in a package which includes two or more POPs, a selection unit to select the first content out of contents included in the first POP of the package, a specifying unit to specify the first webpage including the first content, and an examination unit to examine whether the first POP and one or more contents included in the first POP satisfy the first relation and to examine whether the first POP and the second POP linked to the first POP via the second content satisfy the second relation on at least any one of the first webpage or one or more webpages linked to the first webpage.

6 Claims, 14 Drawing Sheets

(56) References Cited

U.S. PATENT DOCUMENTS

| | | |
|---|---|---|
| 7,856,492 B2 * | 12/2010 | Kato et al. .................... 709/223 |
| 7,900,256 B2 * | 3/2011 | Kondo ........................... 726/23 |
| 2002/0116517 A1 * | 8/2002 | Hudson et al. ................ 709/231 |
| 2002/0136427 A1 * | 9/2002 | Staring et al. ................. 382/100 |
| 2005/0198044 A1 * | 9/2005 | Kato et al. .................... 707/100 |
| 2008/0000969 A1 * | 1/2008 | Salomonsen et al. ......... 235/386 |

FOREIGN PATENT DOCUMENTS

| | | |
|---|---|---|
| JP | 2001282749 A | 10/2001 |
| JP | 2002091909 A | 3/2002 |
| JP | 2002222286 A | 8/2002 |
| JP | 2007140709 A | 6/2007 |
| JP | 2007188356 A | 7/2007 |

* cited by examiner

FIG.3
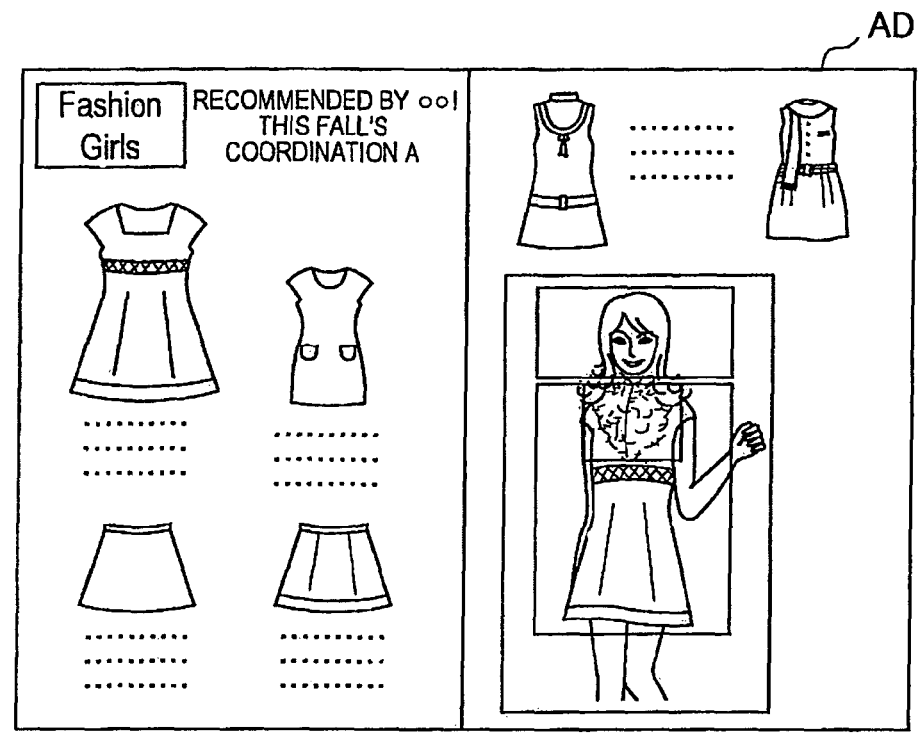
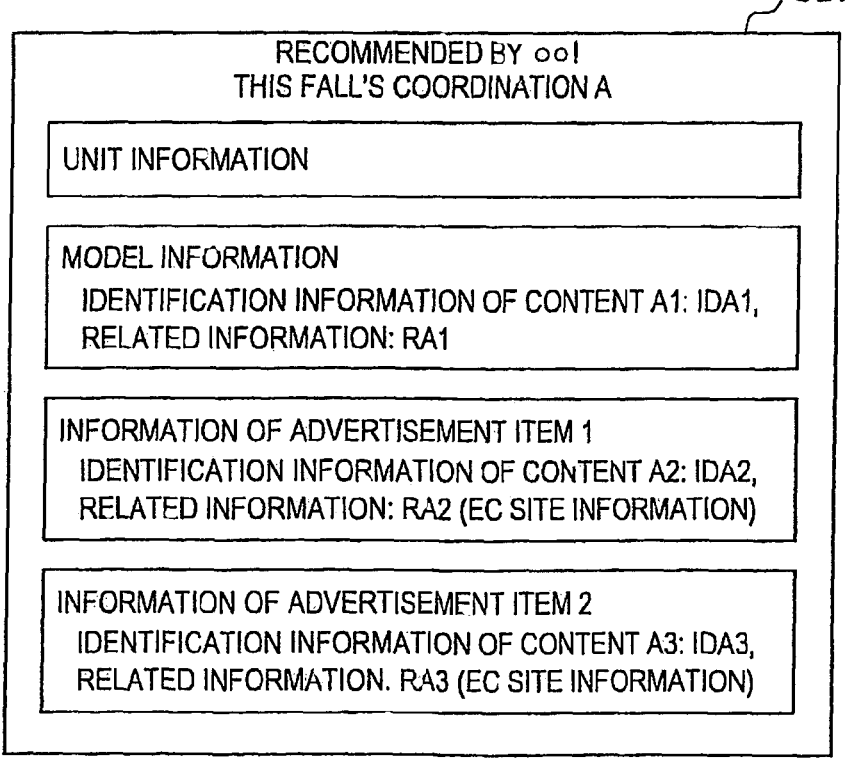

CONTENT USAGE MANAGING APPARATUS, CONTENT USAGE MANAGING METHOD AND PROGRAM

CROSS-REFERENCE TO RELATED APPLICATION

The present application claims priority from Japanese Patent Application No. JP 2008-331222 filed in the Japanese Patent Office on Dec. 25, 2008, the entire content of which is incorporated herein by reference.

BACKGROUND OF THE INVENTION

1. Field of the Invention

The present invention relates to a content usage managing apparatus, a content usage managing method and a program.

2. Description of the Related Art

In related art, advertisement business of providing advertisement information has been performed for a specific service provider who provides a service such as electronic commerce (EC) on a website. An advertisement dealer provides a content group including a number of contents as the advertisement information for service providers and a specific service provider provides a service utilizing the content group on one's own website in compliance with usage rules and the like of the content group.

For example, the content group is configured as a group of content subgroups which respectively include one or more contents. The content subgroup includes one or more contents having mutual relativity and being displayed on a single webpage or one or more webpages to be displayed therewith. Meanwhile, in the content group, the content subgroups are linked from one another via the content included in the content subgroup. Accordingly, the content group is configured so that a number of contents included in the content group have predetermined relativity from one another.

The content group is provided to the specific service provider and utilized in compliance with the usage rules restricting unauthorized usage of the content such as usage in part and usage with modifying the predetermined relativity of the content included in the content group. Meanwhile, the content included in the content group is possible to be utilized by other service providers. Accordingly, some service providers copy the content in an unauthorized manner from a website of the specific service provider and utilize the content on one's own-related website without permission. Here, depending on the usage status and the like of the content group, there is a case that the unauthorized usage of the content by the other service provider is desired to be restricted.

In related art, embedding hidden information such as an electronic watermark and a fingerprint into the content is known as means to prevent the content from being copied in an unauthorized manner. By performing a detection process of the hidden information embedded in the content, the advertisement dealer can identify the content copied in an unauthorized manner and specify an unauthorized usage of the content.

There exist an unlimited number of contents utilized by service providers who provide services on websites. In addition, the detection process of the hidden information embedded in the content requires considerable time. Therefore, it is practically difficult to specify an unauthorized usage of the content by performing the detection process of the hidden information on the contents respectively one by one.

In light of the foregoing, it is desirable to provide a content usage managing apparatus, a content usage managing method and a program with which unauthorized usage of a content included in a content group can easily be specified.

SUMMARY OF THE INVENTION

According to a first embodiment of the present invention, there is provided a content usage managing apparatus which includes a memory unit which stores a first relation between a content subgroup and one or more contents included in the content subgroup and a second relation between the content subgroups linked via a content in a content group which includes the two or more content subgroups, a selection unit which selects a first content out of contents included in a first content subgroup of the content group, a specifying unit which specifies a first webpage including the first content, and an examination unit which examines whether the first content subgroup and one or more contents included in the first content subgroup satisfy the first relation and examines whether the first content subgroup and a second content subgroup linked to the first content subgroup via a second content satisfy the second relation, on at least any one of the first webpage or one or more webpages linked to the first webpage.

According to the abovementioned configuration, it is examined whether the first content subgroup and the one or more contents included in the first content subgroup satisfy the first relation, and then, it is examined whether the first content subgroup and the second content subgroup linked via the second content satisfy the second relation, on at least any one of the first webpage or one or more webpages linked to the first webpage.

Since a specific service provider utilizes the content group in compliance with usage rules of the content group, the predetermined relativity of the contents included in the content group is maintained. On the other hand, since another service provider utilizes the content included in the content group in part or with modifying the predetermined relativity despite of the usage rules of the content group, the predetermined relativity of the contents included in the content group is not maintained. Therefore, by examining unsatisfactory of at least either the first relation or the second relation at the webpages related to the service providers, unauthorized usage of the content can be specified. In this manner, unauthorized usage of the content can easily be specified without performing a detection process of hidden information on the contents respectively one by one.

The memory unit may store identification information of one or more contents included in the content subgroup to be related to the content subgroup and may store identification information of a content which links the content subgroup and another content subgroup to be related to the content subgroup or the other content subgroup, the specifying unit may specify the first webpage in which identification information of the first content is embedded, and the examination unit may examine whether identification information of one or more contents included in the first content subgroup is embedded in the first webpage or other one or more webpages to be displayed along with the first webpage and may examine whether identification information of the second content which links the first content subgroup and the second content subgroup is embedded in the first webpage, another webpage to be displayed along with the first webpage or a webpage capable of being transferred with the first webpage.

Thus, it is examined whether the predetermined relativity of the content included in the content group is maintained by utilizing the content identification information, and then, the unauthorized usage of the content is specified. Accordingly, even if most of the identification information of the content included in the content group is deleted or changed, the unauthorized usage of the content can be specified by examining whether the predetermined relativity of the content is maintained as long as at least single identification information exists without being changed.

In a case that the first relation and the second relation are satisfied on the first content, the selection unit may further select a third content which is included in the second content subgroup, the specifying unit may further specify a second webpage which includes the third content, and the examination unit further may examine whether the second content subgroup and one or more contents included in the second content subgroup satisfy the first relation and may examine whether the second content subgroup and a third content subgroup linked to the second content subgroup via the second content satisfy the second relation, on at least any one of the second webpage or one or more webpages linked to the second webpage.

Accordingly, the unauthorized usage of the content can be effectively specified at the webpages related to the first webpage which includes the first content.

The memory unit further may store a third relation between the content subgroup and related information related to one or more contents included in the content subgroup and a fourth relation between the content subgroups linked via related information of a content, and the examination unit further may examine whether the first content subgroup and related information of one or more contents included in the first content subgroup satisfy the third relation and may examine whether the first content subgroup and the second content subgroup linked to the first content subgroup via the second content satisfy the fourth relation, on at least any one of the first webpage or one or more webpages linked to the first webpage.

Accordingly, even if the unauthorized usage is not specified based on the first relation and the second relation of the content, the unauthorized usage can be specified based on the third relation and the fourth relation of the related information of the content. In addition, it is possible to determine the status of the unauthorized usage of the content.

The selection unit may select the first content on a random basis.

According to a first embodiment of the present invention, there is provided a content usage managing method to perform content usage management with a computer which includes the steps of storing a first relation between a content subgroup and one or more contents included in the content subgroup and a second relation between the content subgroups linked via a content in a content group which includes the two or more content subgroups, selecting a first content out of contents included in a first content subgroup of the content group, specifying a first webpage including the first content, and examining whether the first content subgroup and one or more contents included in the first content subgroup satisfy the first relation and examining whether the first content subgroup and a second content subgroup linked to the first content subgroup via a second content satisfy the second relation, on at least any one of the first webpage or one or more webpages linked to the first webpage.

Accordingly, the unauthorized usage of the content can easily be specified without performing the detection process of the hidden information on the contents respectively one by one.

According to a third aspect of the present invention, there is provided a program for causing a computer to execute the content usage managing method of the second aspect.

According to the present invention, there can be provided a content usage managing apparatus, a content usage managing method and a program with which unauthorized usage of a content included in a content group can be easily specified.

BRIEF DESCRIPTION OF THE DRAWINGS

FIG. 3 is a view which illustrates an example of the data structure of a unit;

DETAILED DESCRIPTION OF THE EMBODIMENTS

Figure 1:
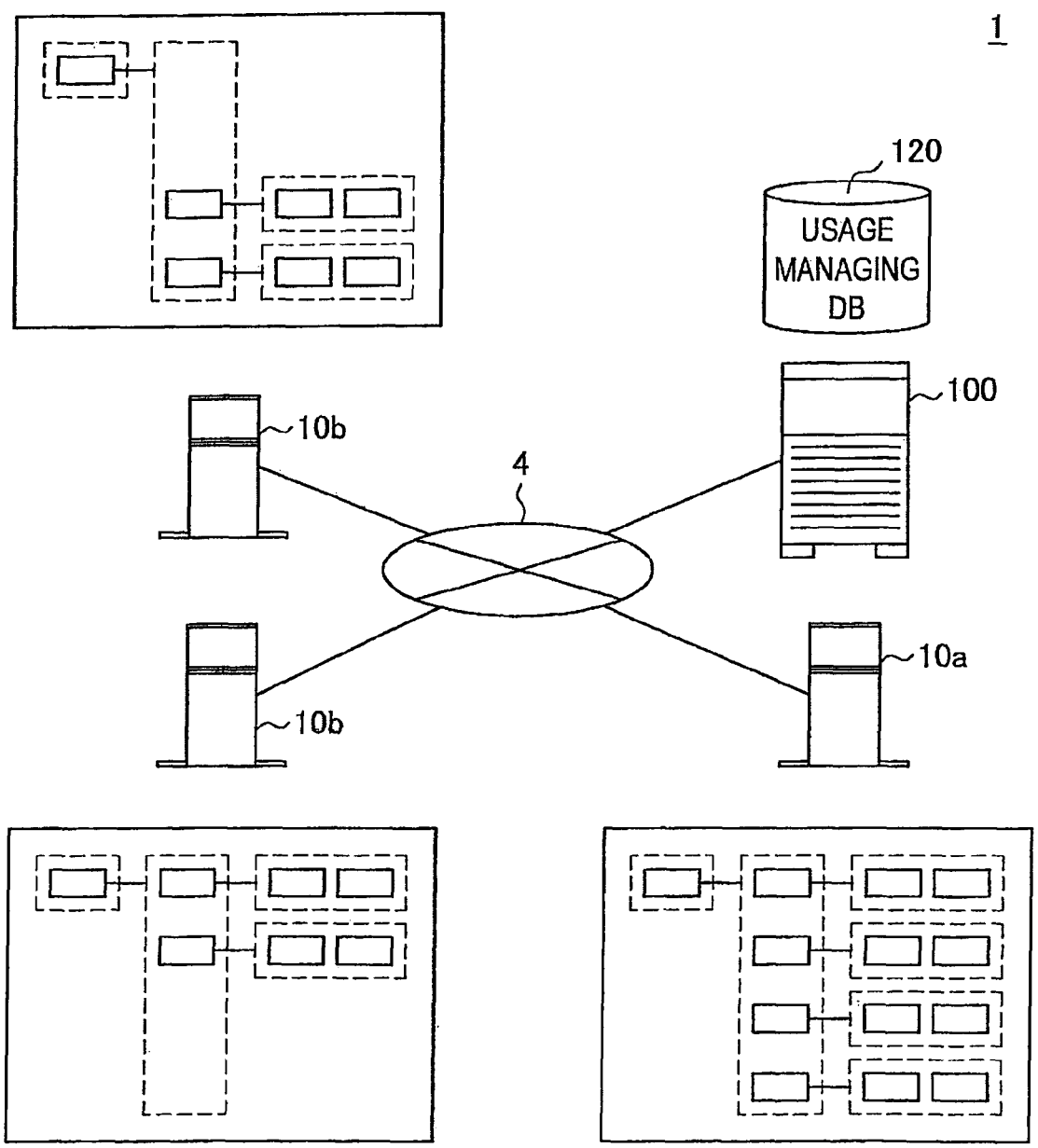
FIG. 1 is a schematic view which illustrates the content usage managing system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Summary of Content Usage Managing System 1]

First, a summary of a content usage managing system according to the present invention will be described with reference to FIG. 1. FIG. 1 is a schematic view which illustrates the content usage managing system 1. In the following description, the content usage managing system 1 is adapted to usage management of advertisement information provided for EC dealers. However, the content usage management system 1 may be adapted to usage management of other information.

As illustrated in FIG. 1, the content usage managing system 1 is configured to include EC servers 10 and a content usage managing server 100 (hereinafter, also called a usage managing server 100) which are connected from one another via a communication network 4. An EC server 10a operated by a specific EC dealer and EC servers 10b operated by another EC dealer are illustrated as the EC servers 10. It is also possible that the specific EC dealer operates one or more EC servers 10a and that the other EC dealer operate two or more EC servers 10b.

The usage managing server 100 is operated by an advertisement dealer providing advertisement information for EC dealers to the specific EC dealer. Incidentally, instead of the advertisement dealer, the usage managing server 100 may be operated by a management dealer performing the content usage management.

The advertisement dealer provides a package (i.e., a content group) including a number of contents as the advertisement information for EC dealers. The specific EC dealer provides a service on one's own website by utilizing the package in compliance with the usage rules and the like of the package.

For example, the package (i.e., the content group) is configured as a group of POPs (i.e., a group of content subgroups) which respectively include one or more contents. The POP includes a mutually related content displayed on a single webpage or one or more webpages to be displayed therewith. Meanwhile, in the package, the POPs are linked from one another via the content included in the POP. Accordingly, the package is configured so that a number of contents included in the package have predetermined relativity from one another.

The package is provided to the specific EC dealer and the specific EC dealer utilizes the package in compliance with the usage rules restricting unauthorized usage of the content. On the other hand, another EC dealer copies the content in an unauthorized manner from a website of the specific EC dealer and utilizes the content on one's own-related website without permission.

For example, in the case of FIG. 1, the content included in the package is utilized at the EC server 10a of the specific EC dealer in a state that the predetermined relativity is maintained. On the other hand, the content included in the package is utilized at the EC server 10b of the other EC dealer in a state that the predetermined relativity is not maintained. Depending on the usage status and the like of the package, there is a case that the unauthorized usage of the content by the other EC dealer is desired to be restricted.

In the content usage managing system 1 according to the present invention, the usage managing server 100 stores, at a usage managing database 120, the first relation between the POP and one or more contents included in the POP and the second relation between the POPs linked via the content in the package which includes two or more POPs.

First, the usage managing server 100 selects the first content from the contents included in the first POP of the package which is to be an examination target. After the first content is selected, the usage managing server 100 specifies the first webpage which includes the first content via the communication network 4 with a search engine and the like.

After the first webpage is specified, the usage managing server 100 examines a predetermined webpage which is at least either the first webpage or one or more webpages to be linked to the first webpage. On the predetermined webpage, the usage managing server 100 examines whether the first POP and one or more contents included in the first POP satisfy the first relation and examines whether the first POP and the second POP linked via the second content satisfy the second relation.

Since the specific EC dealer utilizes the package in compliance with the usage rules of the package, the predetermined relativity of the content included in the package is maintained. On the other hand, since the other EC dealer utilizes the content included in the package in part or with modifying the predetermined relativity despite of the usage rules of the package, the predetermined relativity of the content included in the package is not maintained.

Therefore, the usage managing server 100 can specify unauthorized usage of the content on webpages relating to EC dealers by examining unsatisfactory of at least either the first relation or the second relation. In this manner, unauthorized usage of the content can easily be specified without performing a detection process of hidden information on the contents respectively one by one.

[2. Advertisement Providing System 2]

Next, an advertisement providing system 2 to which a content usage managing method according to an embodiment of the present invention is applied will be described with reference to FIGS. 2 to 7. In the following description, the content usage managing method is applied to the advertisement providing system 2. However, the content usage managing method can be applied to another content providing system.

[2-1. Configuration of Advertisement Providing System 2]

Figure 2:
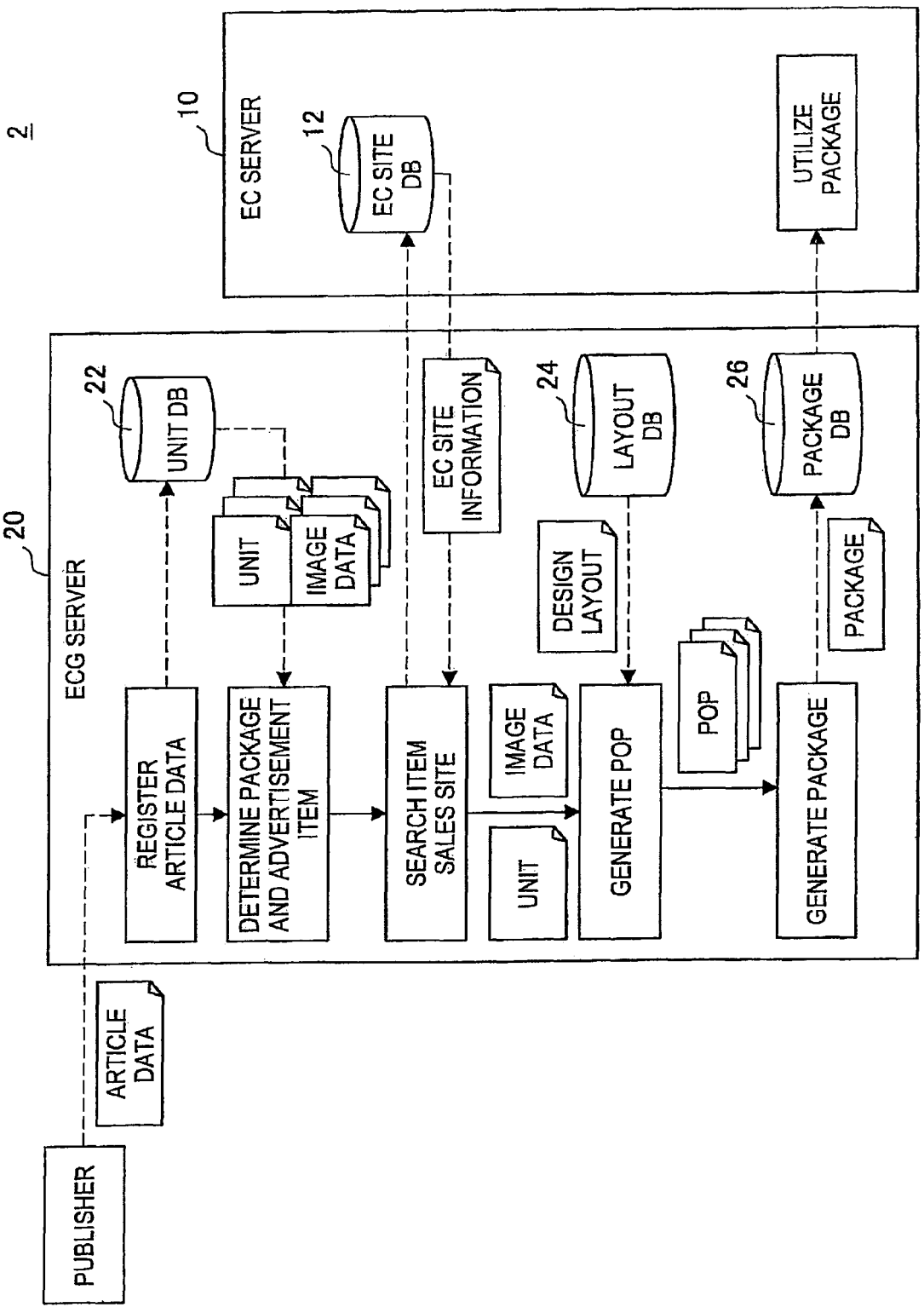
FIG. 2 is a schematic view which illustrates procedure of the advertisement providing method with the advertisement providing system.

First, the advertisement providing system 2 to which the content usage managing method according to one embodiment of the present invention will be described with reference to FIG. 2. FIG. 2 is a schematic view which illustrates procedure of the advertisement providing method with the advertisement providing system 2.

As illustrated in FIG. 2, the advertisement providing method 2 is configured to include the EC server 10 which is operated by the EC dealer and an electronic content guide (ECG) server 20 which is operated by the advertisement dealer. Both of the EC server 10 and the ECG server 20 are respectively constituted from an information processing system including a server device.

The EC server 10 performs procedure of electric commerce with a user via an EC site. The EC server 10 has an EC site database (DB) 12. The EC site DB 12 manages EC site information including item information of sale items which are sold via the EC site. The EC server 10 transmits the EC site information, a sales log and the like to the ECG server 20 and receives the package for EC dealers from the ECG server 20.

The EC site information includes a uniform resource locator (URL) of the EC site along with the information such as an item code, a name, a category, an image, a manufacturing and selling source, a sale price and the like as the item information of the sale item. The sales log includes information of a site browsing history of the purchaser along with the information such as the item code, the name, the date and time of the sale, the sale price, the purchaser and the sale site of the sale item.

The ECG server 20 provides the package as the advertisement information for EC dealers to the EC server 10 which is operated by the EC dealer. The ECG dealer 20 includes a unit database (DB) 22, a layout database 24 and a package database 26.

The ECG server 20 registers article data expected to be contained in a publication after obtaining from a publisher and generates a unit of the advertisement item and an image related to the unit (i.e. the contents) from the article data. The unit DB 22 manages the units and images of the advertisement items.

Here, the article data includes the information such as an item code, a name, an image, a manufacturing and selling source, a suggested retail price, and additional information of the advertisement item expected to be contained in the publication. The additional information denotes the information added to enhance advertisement effects of the advertisement item for preparing the advertisement article. For example, the additional information is the information such as a name of an advertisement model, an image of the advertisement model, (for example, an image of the model wearing the advertisement item), an item introduction comment by the model, a name and issue number of the publication in which the advertisement article is expected to be contained, and a feature title in which the advertisement article is expected to be contained.

The ECG server 20 generates the POP including the information of the unit, the image and the design layout of the advertisement item and generates the package including one or more POPs. The layout DB 24 manages the design layout information added at the time of generating the POP. The package DB 26 manages the package including one or more POPs. The ECG server 20 transmits the package to the EC server 10 and receives the EC site information, the sales log and the like from the EC server 10.

[2-2. Advertisement Providing Method]

Figure 4:
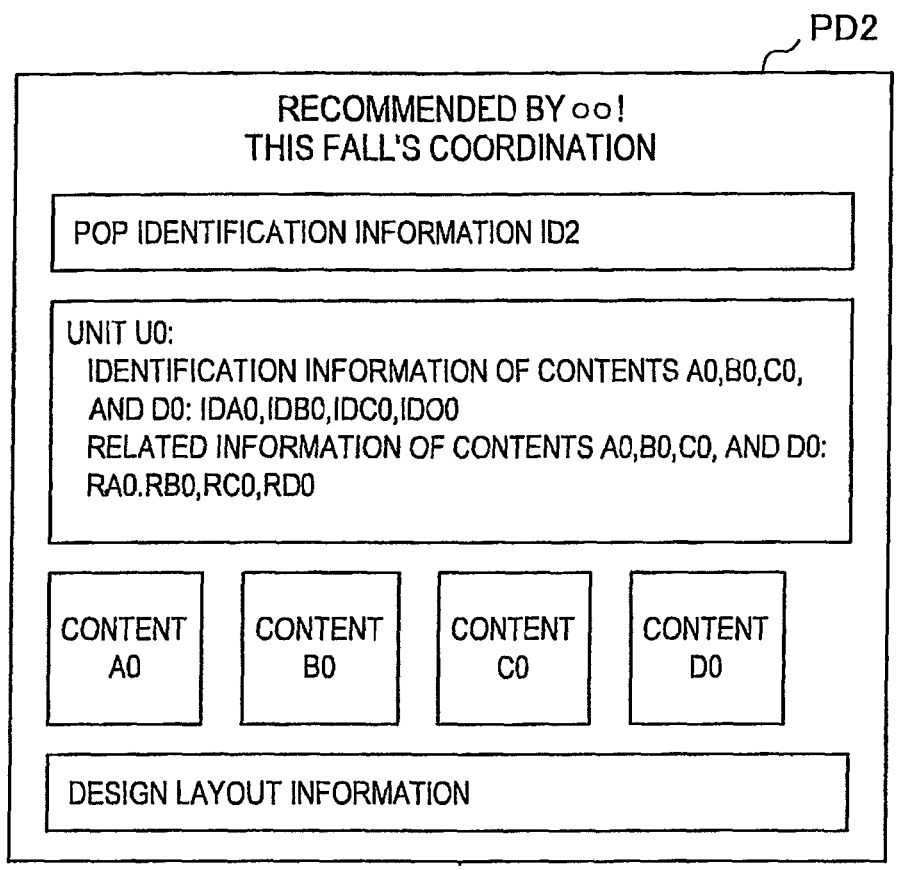
FIG. 4 is a view which illustrates an example of the data structure of a POP.
Figure 5:
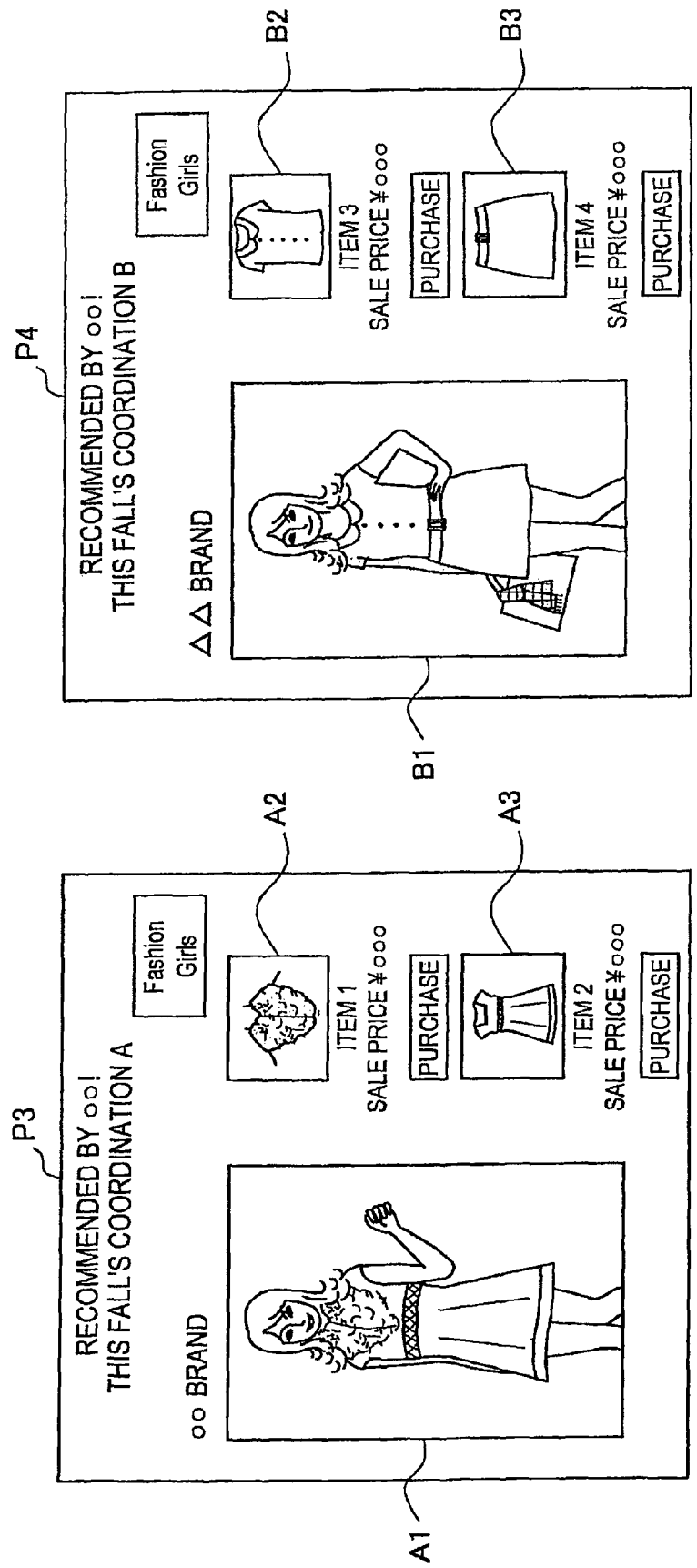
FIG. 5 is a view which illustrates a display example of the POP.
Figure 6:
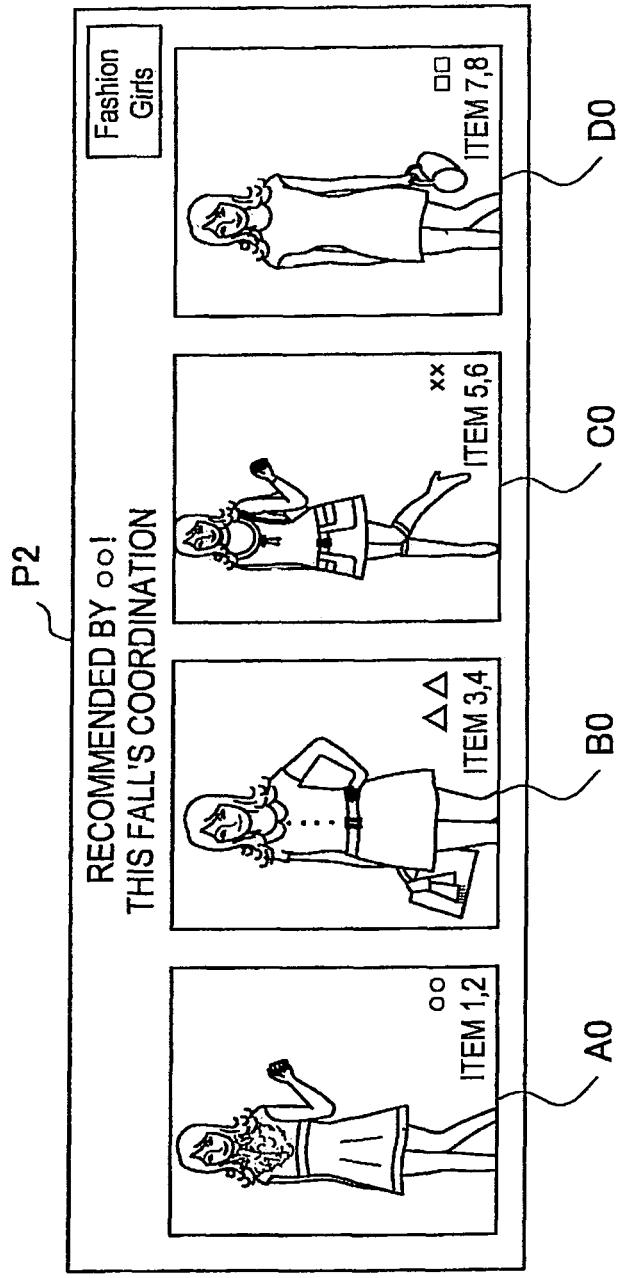
FIG. 6 is a view which illustrates a display example of the POP.
Figure 7:
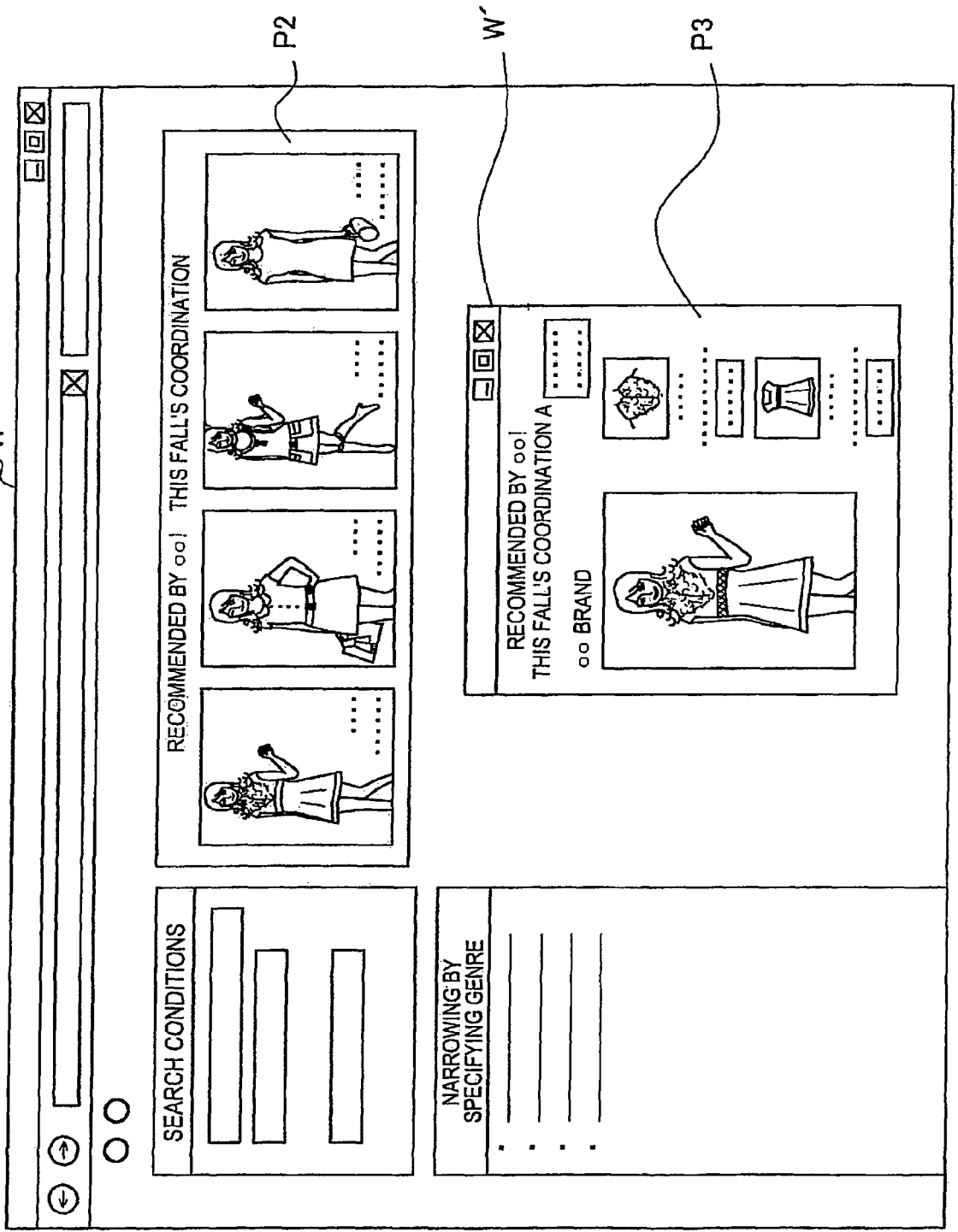
FIG. 7 is a view which illustrates a display example of the POP.

Next, the advertisement providing method with the advertisement providing system 2 will be described with reference to FIGS. 3 to 7. FIGS. 3 and 4 are views to illustrate examples of data structure of the unit and the POP. FIGS. 5 to 7 are views to illustrate display examples of the POP.

The ECG server 20 registers the article data expected to be contained in the publication after obtaining from the publisher. The article data is prepared as desktop publishing (DTP) data and the like. The ECG server 20 extracts advertisement data of the advertisement item from the registered article data. Then, the ECG server 20 generates the unit and image of the advertisement item (i.e., the content) and stores at the unit DB 22.

FIG. 3 illustrates an example of a data structure of the unit. FIG. 3 illustrates the data structure UDA of the unit UA generated from the article data AD of "Recommended by ••! This Fall's Coordination A". The unit UA includes the unit information, the model information and information of advertisement items 1, and 2 which are extracted from the article data AD.

The unit information includes an article name, an advertisement copy, an advertisement brand name, a magazine logo and the like. The model information includes identification information IDA1 of the model image (i.e., the content A1) and related information RA1 to the image along with various information of the model. The information of the advertisement item 1 includes the EC site information, identification information IDA2 of the image of the advertisement item 1 (i.e., the content A2) and related information RA2 to the image along with various information of the advertisement item 1. Similarly, the information of the advertisement item 2 includes the EC site information, identification information IDA3 of the image of the advertisement item 2 (i.e., the content A3) and related information RA3 to the image along with various information of the advertisement item 2.

The identification information of the content is text information to identify the content. For example, the identification information is an ID number, a data name of the content, information indicating a contact to obtain the content (a URL etc.) and the like. Further, the related information is text information related to the content. For example, the related information is the item code, the name, the manufacturing and selling source, additional information and the like of the item.

The ECG server 20 determines the advertisement item included in the package based on the information included in the unit. The ECG server 20 specifies the EC site which sells the advertisement item included in the package. Here, the ECG server 20 specifies the EC site which sells the advertisement item taking the item information and the like of the advertisement item included in the package as search conditions. The ECG server 20 obtains the EC site information from the specific EC site. The EC site information includes the item information of a sale item corresponding to the advertisement item, the URL of the EC site selling the advertisement item and the like.

The ECG server 20 generates the POP which includes the unit and image of the advertisement item managed by the unit DB 22, the EC site information obtained from the EC site, and the design layout information managed by the layout DB 24. Then, the ECG server 20 generates the package which includes one or more POPs.

FIG. 4 illustrates an example of a data structure of the POP. FIG. 4 illustrates the data structure PD2 of the POP P2 including the unit U0 which is generated from the article data of the article "Recommended by ! This Fall's Coordination". The POP P2 includes the unit U0, the contents A0, B0, C0, and D0 (i.e., the contents respectively related to each unit UA, UB, UC, and UD), and the design layout information for displaying the POP P2. In addition, the POP P2 includes identification information ID2 of the POP P2 which is formed of text information. The unit U0 includes identification information IDA0, IDB0, IDC0, and IDD0 and related information RA0, RB0, RC0, and RD0 of the contents A0, B0, C0, and D0.

The advertisement dealer makes a usage contract of the package with the EC dealer operating the specified EC site and provides the package to the EC server 10 operated by the EC dealer. The EC dealer provides an EC service utilizing the package on one's own website in compliance with the usage rules.

When the unit information, the model information and the advertisement item information to be included in the unit are updated, the ECG server 20 updates the information included in the unit. Similarly, when the unit, the content and the design layout information included in the package are updated, the ECG server 20 updates the information included in the package. The ECG server 20 provides the updated unit and package to the EC dealer under the package usage contract while storing at the unit DB 22 and the package DB 26.

FIG. 5 illustrates display examples of the POPs P3, and P4. The POP P3 includes the unit UA of FIG. 3, the contents A1 to A3 to be related to the unit UA and the design layout information for displaying the POP P3. Similarly, the POP P4 includes the unit UB, the contents B1 to B3 to be related to the unit UB and the design layout information for displaying the POP P4.

The data included in the POP is utilized for document data or a part of the document data for a webpage described in hypertext markup language (HTML), extensible hypertext markup language (XHTML) or the like and utilized for displaying the information included in the POP on the webpage.

When a user uses an EC service, a user terminal obtains the data of the POP P3 from the webpage of the EC site and displays the information included in the POP P3 of FIG. 5 on a screen according to the design layout information of the POP P3. The user terminal displays the article name, the advertisement copy, the advertisement brand name and the magazine logo as the information of the unit UA. Further, the user terminal displays the content A1 as the model information based on the identification information IDA1 of the content A1. Furthermore, the user terminal displays the contents A2 and A3 based on the identification information IDA2 and IDA3 of the contents A2 and A3 along with names and sale prices of the advertisement items 1 and 2 as the information of the advertisement items 1 and 2.

Similarly, the user terminal displays the information included in the POP P4 on the screen based on the information of the unit UB, the model information, the information of the advertisement items 3 and 4, and design layout information which are included in the POP P4.

FIG. 6 illustrates a display example of the POP P2. The POP P2 corresponds to the POP P2 of FIG. 4. The user terminal obtains the data of the POP P2 from the webpage of the EC site and displays the information included in the POP P2 as illustrated in FIG. 6 on the screen. The user terminal displays the article name and the magazine logo as the information of the unit U0. Further, the user terminal displays the contents A0, B0, C0, and D0 based on the identification information IDA0, IDB0, IDC0, and IDD0 of the contents A0, B0, C0, and D0 as the model information.

FIG. 7 illustrates a display example on a web-browser of the webpage W including the POPs P3 and P4 of FIG. 5 and the POP P2 of FIG. 6. In the example of FIG. 7, when the POP P1 (not illustrated) for a top menu is displayed, the user determines to use a selection menu through the POP P1. Next, the user determines selection of the contents A0, B0, C0, and D0 through the POP P2 for a selection menu. Then, when the content A0 is selected, for example, the POP P3 including the contents A1 to A3 related to the content A0 is displayed on another webpage W' to be displayed along with the webpage W on which the POP P2 is displayed.

When the user performs purchase procedure with utilizing the package, the ECG server 20 obtains a sales log of the advertisement item from the EC server 10. When the advertisement item is sold, the EC dealer collects the sales charge from the user and provides a predetermined sales margin included in the sales charge to the advertisement dealer.

[3. Content Usage Managing Server 100]

Figure 8:
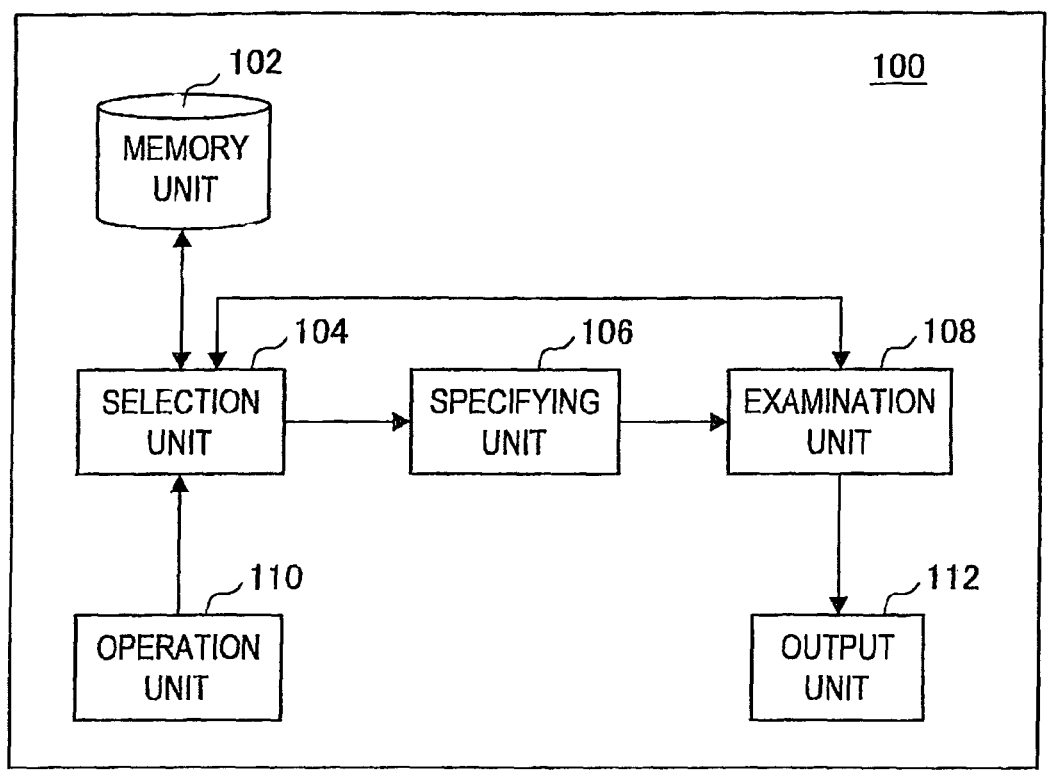
FIG. 8 is a block diagram which illustrates the main functional configuration of the content usage managing server.

Next, the configuration of the content usage managing server 100 according to an embodiment of the present invention will be described with reference to FIG. 8. FIG. 8 is a block diagram which illustrates the main functional configuration of the content usage managing server 100. The usage managing server 100 may be configured to be a part of the ECG server 20 included in the advertisement providing system 2 or to be another server device.

As illustrated in FIG. 8, the usage managing server 100 is configured to include a memory unit 102 (including the usage managing database 120 of FIG. 1), a selection unit 104, a specifying unit 106, an examination unit 108, an operation unit 110 and an output unit 112.

The memory unit 102 stores the predetermined relation between the POP and one or more contents included in the POP (i.e., the first relation) and the predetermined relation between the POPs linked via the content (i.e., the second relation). Selectively, the memory unit 102 stores a predetermined relation between the POP and the related information which is related to one or more contents included in the POP (i.e., the third relation) and a predetermined relation between the POPs linked via the related information of the content (i.e., the fourth relation). The memory unit 102 may be configured to be the package DB 26 of the ECG server 20 or to be another database.

The selection unit 104 selects the first content out of the contents included in the first POP of the package. Selectively, the selection unit 104 selects the third content included in the second POP of the package. The selection unit 104 may select the first content on a regular basis by a predetermined rule or on a random basis.

The specifying unit 106 specifies the first webpage which includes the first content. Selectively, the specifying unit 106 specifies the second webpage which includes the third content.

The examination unit 108 examines at least either the first webpage or one or more webpages linked to the first webpage. The examination unit 108 examines whether the first POP and one or more contents included in the first POP satisfy the first relation. Then, the examination unit 108 examines whether the first POP and the second POP linked via the second content satisfy the second relation.

Selectively, the examination unit 108 examines either the second webpage or one or more webpages linked to the second webpage. The examination unit 108 examines whether the second POP and one or more contents included in the second POP satisfy the first relation. Then, the examination unit 108 examines whether the second POP and the third POP linked via the third content satisfy the second relation.

Selectively, the examination unit 108 examines whether the first POP and the related information of one or more contents included in the first POP satisfy the third relation. Then, the examination unit 108 examines whether the first POP and the second POP linked via the related information of the second content satisfy the fourth relation.

The operation unit 110 receives input of the operation information by an administrator managing the usage managing server 100. The output unit 112 outputs a usage managing menu, an execution result of the usage managing method and the like to the outside as character information, image information, audio information and the like.

[4. Content Usage Managing Method]

In the following, the content usage managing method according to an embodiment of the present invention will be described with reference to FIGS. 9 to 13.

[4-1. Package]

Figure 9:
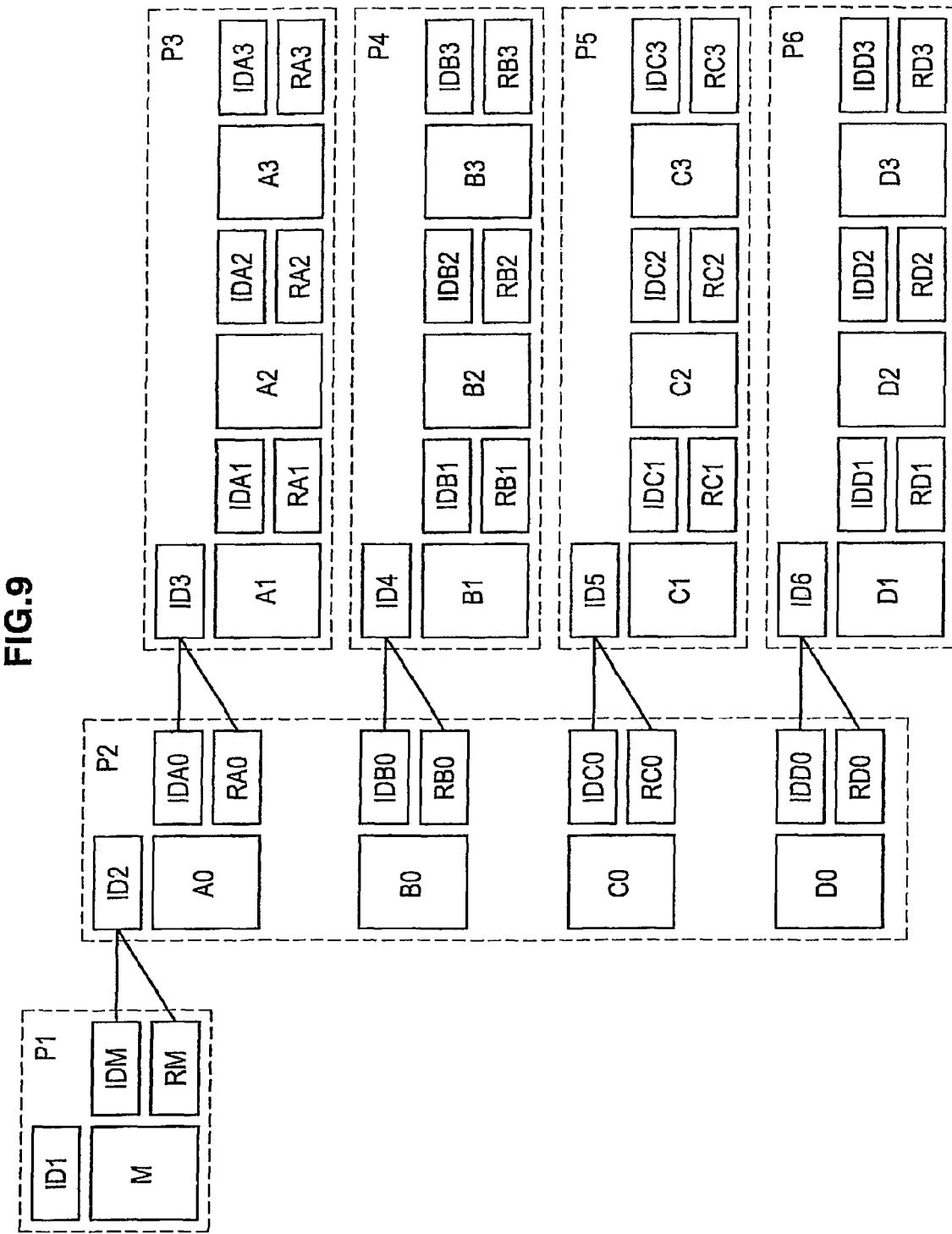
FIG. 9 is a view which illustrates an example of the data structure of a package.
Figure 10:
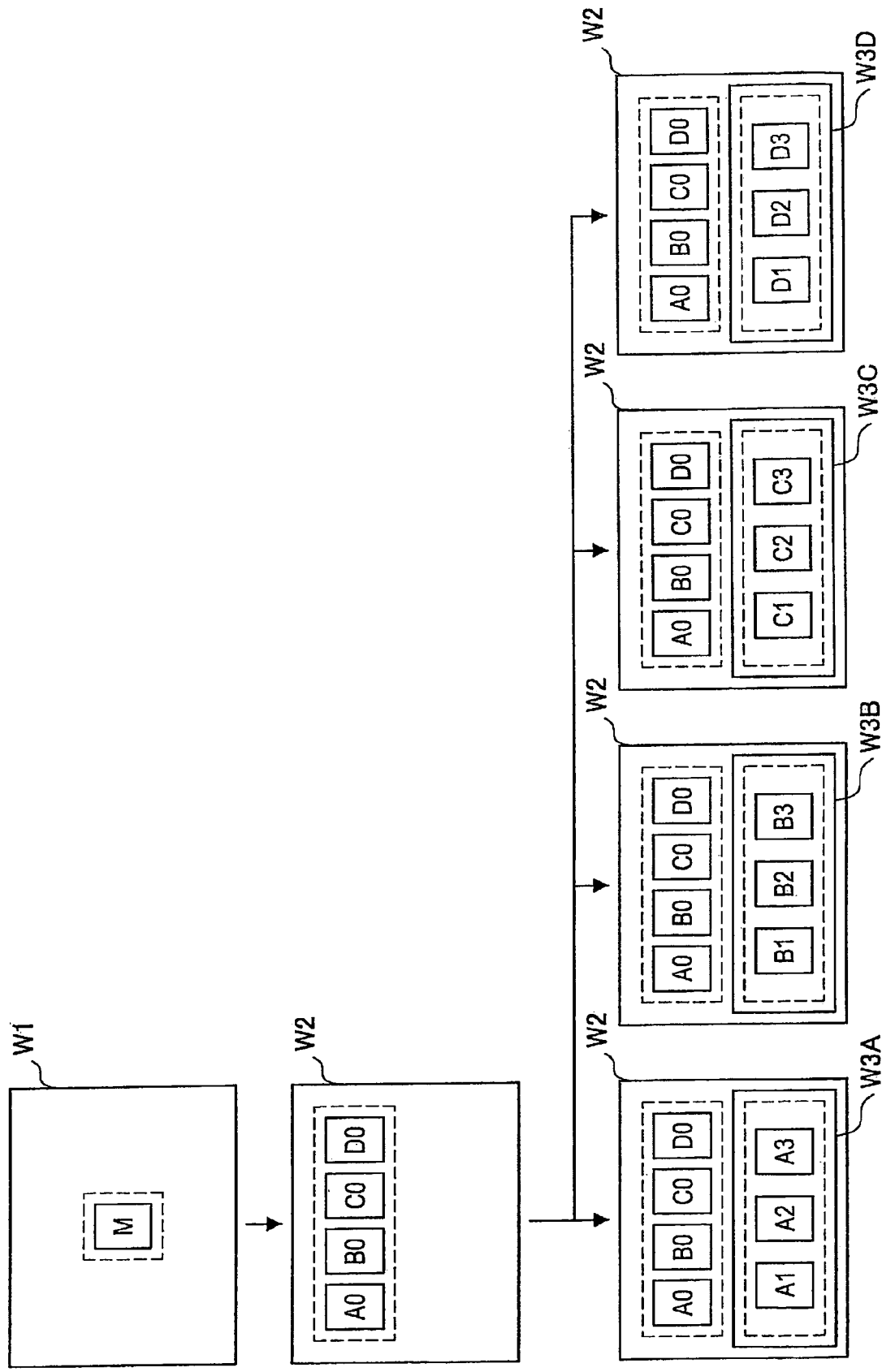
FIG. 10 is a view which illustrates display transition of contents included in the package of FIG. 9.

First, the package to which the content usage managing method according to the embodiment of the present invention is applied will be described with reference to FIGS. 9 and 10. FIG. 9 is a view which illustrates an example of the data structure of the package. FIG. 10 is a view which illustrates display transition of the contents included in the package of FIG. 9. Incidentally, for the convenience of description, FIGS. 9 and 10 only illustrate main data.

As illustrated in FIG. 9, the package includes the POPs P1 to P6. The POP P1 includes the content M for the top menu and the POP P2 includes the contents A0, B0, C0, and D0 for the selection menu. The POPs P3 to P6 respectively include the contents A1 to A3, the contents B1 to B3, the contents C1 to C3, the contents D1 to D3 respectively related to details of the contents A0, B0, C0, and D0.

Each of the POP identification information ID1 to ID6 is respectively given to the POPs P1 to P6. Each of the content identification information IDM, IDA0 to IDA3, IDB0 to IDB3, IDC0 to IDC3, and IDD0 to IDD3 is respectively given to the contents M, A0 to A3, B0 to B3, C0 to C3, and D0 to D3. The identification information IDM of the content M is related to the identification information ID1 of the POP P1. Each of the identification information IDA0, IDB0, IDC0, and IDD0 of the contents A0, B0, C0, and D0 is related to the identification information ID2 of the POP P2. Further, the contents A1 to A3, B1 to B3, C1 to C3, and D1 to D3 are respectively related to the identification information ID3 to ID6 of the POPs P3 to P6.

Then, the identification information ID2 of the POP P2 linked to the POP P1 via the content M is related to the identification information IDM of the content M. Further, the identification information ID3 of the POP P3 linked to the POP P2 via the content A0 is related to the identification information IDA0 of the content A0. Similarly, the identification information ID4 of the POP P4, the identification information ID5 of the POP P5 and the identification information ID6 of the POP P6 are respectively related to the identification information IDB0 of the content B0, the identification information IDC0 of the content C0 and the identification information IDD0 of the content D0.

Further, each of the related information RM, RA0 to RA3, RB0 to RB3, RC0 to RC3, RD0 to RD3 is respectively related to the contents M, A0 to A3, B0 to B3, C0 to C3, D0 to D3. Then, the related information RM, RA0 to RA3, RB0 to RB3, RC0 to RC3, RD0 to RD3 is respectively related to the identification information ID1 to ID6 of the POPs P1 to P6 as well.

First, by utilizing the package of FIG. 9, the user determines to use the selection menu through the POP P1 (including the content M) for the top menu which is displayed on a webpage W1, as illustrated in FIG. 10. Next, the user determines selection out of the contents A0, B0, C0, and D0 through the POP P2 displayed on a webpage W2 which is transferred from the webpage W1. When the content selection is determined through the POP P2, the contents A1 to A3 are displayed as the details of the content A0, for example, on a webpage W3A to be displayed along with the webpage W2 according to the selected content.

Incidentally, not illustrated in FIG. 10, when displaying the contents M, A0 to A3, B0 to B3, C0 to C3, and D0 to D3, the related information RM, RA0 to RA3, RB0 to RB3, RC0 to RC3, and RD0 to RD3 respectively related to each of the contents is displayed as well.

[4-2. Procedure of Content Usage Managing Method]

Figure 11:
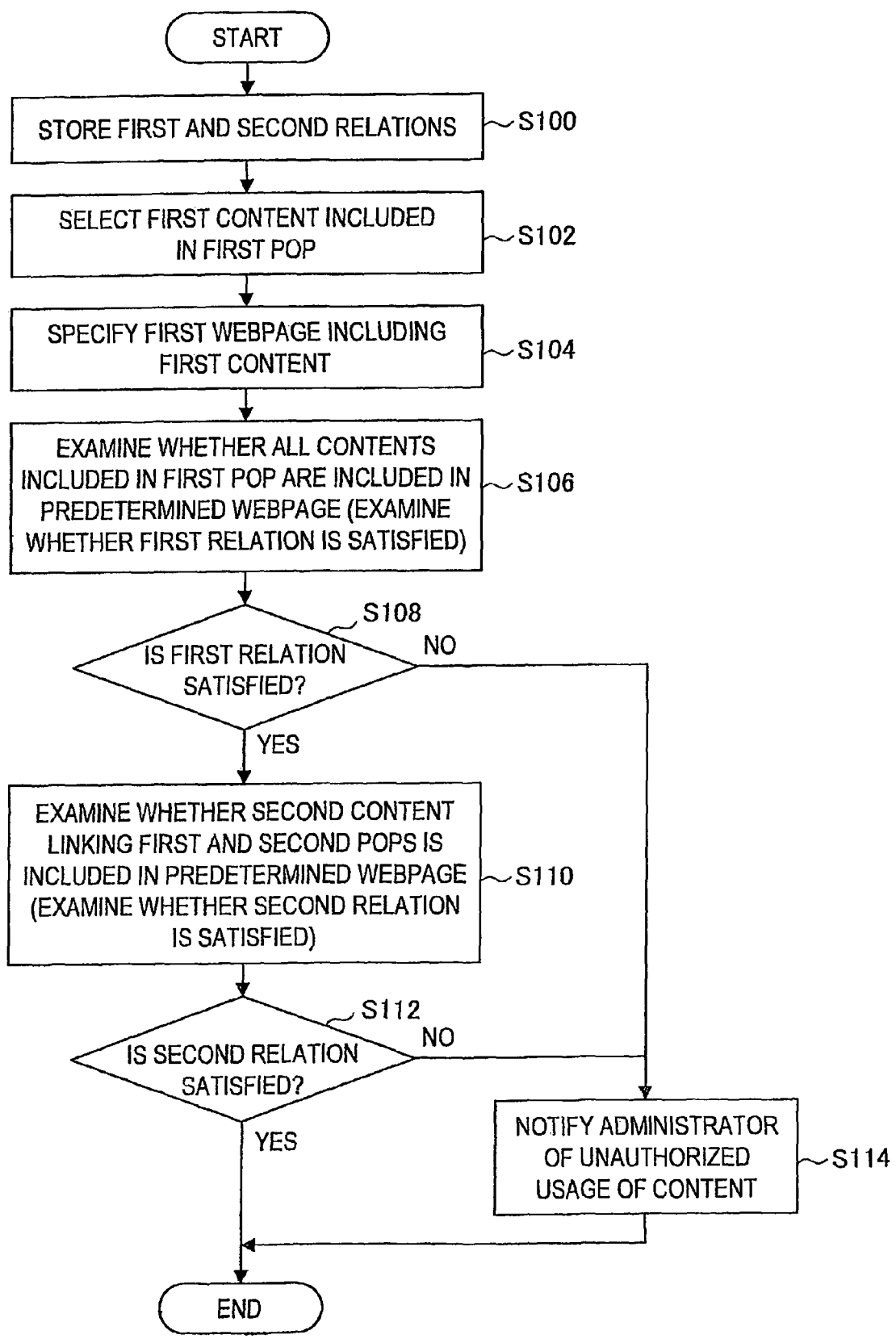
FIG. 11 is a flowchart which describes procedure of the content usage managing method.

Next, the procedure of the content usage managing method will be described with reference to FIG. 11. FIG. 11 is a flowchart to describe the procedure of the content usage managing method.

As described in FIG. 11, the memory unit 102 stores the first relation between the POP and one or more contents included in the POP and the second relation between the POPs linked via the content (S100).

The memory unit 102 may store the identification information of one or more contents included in the POP to be related to the POP. Further, the memory unit 102 may store the identification information of the content which links the POP and the other POP to be related to the POP or the other POP.

For example, in the case of the package of FIG. 9, the memory unit 102 stores the identification information ID1 to ID6 of the POPs P1 to P6 and the identification information IDM, IDA0 to IDA3, IDB0 to IDB3, IDC0 to IDC3, and IDD0 to IDD3 of the contents M, A0 to A3, B0 to B3, C0 to C3, and D0 to D3 to be related to each other.

When an examination start instruction is inputted through the operation unit 110 by the administrator or when it becomes a predetermined examination start time, the usage managing server 100 starts the examination. After the examination is started, the selection unit 104 selects the first content out of the contents included in the first POP of the package (S102).

The selection unit 104 selects the first content based on the information stored in the memory unit 102. Specifically, the selection unit 104 selects the package to be an examination target out of the packages stored in the memory unit 102 and selects the first POP out of the POPs included in the package to be the examination target. Then, the selection unit 104 selects the first content from the first POP.

For example, in the case of the package of FIG. 9, the selection unit 104 selects the content A1 as the first content out of the contents A1 to A3 included in the POP P3 of the package.

The selection unit 104 may select the package to be the examination target, the first POP and/or the first content on a regular basis by the predetermined rule or on a random basis. Compared to the case of selecting on a regular basis, it becomes more difficult for an unauthorized entity to take action to prevent one's unauthorized usage being specified while predicting the first content by selecting the first content on a random basis.

After the first content is selected, the specifying unit 106 specifies the first webpage which includes the first content (S104). The specifying unit 106 may specify the first webpage in which the identification information of the first content is embedded.

For example, in the case of the package of FIG. 9, the specifying unit 106 specifies the webpage W3A in which the identification information IDA1 of the content A1 is embedded as the first webpage.

The specifying unit 106 obtains, from the memory unit 102, the identification information of the first content selected by the selection unit 104. The specifying unit 106 accesses one or more webpages related to the other EC dealer via the communication network 4 and specifies the first webpage in which the text information corresponding to the identification information of the first content is embedded. The specifying unit 106 specifies the first webpage by searching the text information embedded in webpage document data and corresponding to the identification information of the first content.

After the first webpage is specified, the examination unit 108 examines at least either the first webpage and one or more webpages linked to the first webpage. The examination unit 108 examines whether the first POP and one or more contents included in the first POP satisfy the first relation. Then, the examination unit 108 examines whether the first POP and the second POP linked via the second content satisfy the second relation.

In this case, the examination unit 108 specifies one or more webpages linked to the first webpage by searching linkage information embedded in the webpage document data and indicating the linkage relation between the webpages.

The POP includes one or more contents having mutual relativity and displayed on the single webpage or one or more webpages displayed therewith. Accordingly, the examination unit 108 examines whether the POP and the content included in the POP mutually have the predetermined relativity (i.e., the first relation) for examining the first relation.

At the package, the POPs are linked via the content included in the POPs. Accordingly, the examination unit 108 examines whether the POPs linked via the content mutually have the predetermined relativity (i.e., the second relation) of the POPs for examining the second relation.

The examination unit 108 examines one of the first relation and the second relation on the first content, and subsequently, examines the other as necessary. Following description will be on the case that the examination unit 108 examines the second relation as necessary after examining the first relation. Incidentally, when the examination unit 108 examines the first relation as necessary after examining the second relation, when the examination unit 108 determines that the second relation is not satisfied, the examination of the second relation is halted and the examination ends without performing the examination of the first relation.

In order to examine the first relation, the examination unit 108 obtains the information of the first POP and the content included in the first POP from the memory unit 102. Then, the examination unit 108 examines whether all of the contents included in the first POP are included in a predetermined webpage of the first webpage or one or more webpages linked to the first webpage (S106). All of the contents included in the first POP may be included in one webpage corresponding to the predetermined webpage or may be separately included in two or more webpages.

The examination unit 108 sequentially performs the examination on each of the contents included in the first POP. Then, when all of the contents included in the first POP are included in the predetermined webpage, the examination unit 108 determines that the first relation is satisfied ("Yes" in step S108). Then, the examination unit 108 examines the second relation as described later. On the other hand, when any content included in the first POP is not included, the examination unit 108 determines that the first relation is not satisfied ("No" in step S108). Then, the examination of the first relation is halted and the examination ends without performing the examination of the second relation.

The examination unit 108 may examine whether the identification information of one or more contents included in the first POP is embedded in the first webpage or other one or more webpages to be displayed along with the first webpage.

In this case, the examination unit 108 specifies other one or more webpages to be displayed along with the first webpage by searching linkage information contained in the webpage document data and indicating the linkage relation between the webpages. Then, the examination unit 108 examines the first relation by searching the text information embedded in the webpage document data and corresponding to the identification information of one or more contents included in the first POP.

One or more contents included in the POP having mutual relativity are displayed on the single webpage or one or more webpages displayed therewith. Accordingly, since the one or more contents included in the POP are not to be displayed therewith, the examination unit 108 does not examine the first relation on the other webpage which is in linkage relation with the first webpage accompanying the page transfer.

For example, in the case of the package of FIG. 9, the examination unit 108 examines whether the identification information IDA1 to IDA3 of the contents A1 to A3 included in the POP P3 is embedded in the webpage W3A or other one or more webpages to be displayed along with the webpage W3A. Then, since the identification information IDA1 to IDA3 of the contents A1 to A3 is embedded in the webpage W3A, the examination unit 108 determines that the first relation is satisfied on the content A1.

When the first relation is determined to be satisfied, the examination unit 108 obtains, from the memory unit 102, information of the first POP and the second POP linked via the second content in order to examine the second relation. Then, the examination unit 108 examines whether the second content which links the first POP and the second POP is included in a predetermined webpage (S110).

When the second content is included in the predetermined webpage, the examination unit 108 determines that the second relation is satisfied ("Yes" in step S112), and then, ends the examination. On the other hand, when the second content is not included in the predetermined webpage, the examination unit 108 determines that the second relation is not satisfied ("No" in step S112). Then, the examination unit 108 halts the examination of the second relation and ends the examination.

The examination unit 108 may examine whether the identification information of the second content which links the first POP and the second POP is embedded in the first webpage, the other webpage to be displayed along with the first webpage or the webpage capable of being transferred with the first webpage.

In this case, the examination unit 108 specifies the other webpage to be displayed along with the first webpage or the webpage capable of being transferred with the first webpage by searching the linkage information embedded in the webpage document data and indicating the linkage relation between the webpages. Then, the examination unit 108 examines the second relation by searching the text information embedded in the webpage document data and corresponding to the identification information of the second content.

The POP included in the package is linked to the other POP via the content. The content included in the mutually different POPs may not be displayed together. Accordingly, the examination unit 108 examines the second relation on the webpage capable of being transferred with the first webpage as well.

When the webpage in which the identification information of the other content is embedded is the webpage related to the specific EC dealer, the examination unit 108 does not examine the second relation on this webpage. In this case, the examination unit 108 determines whether to examine the second relation based on the previously stored URL and the like of the webpage related to the specific EC dealer.

For example, in the case of the package of FIG. 9, the examination unit 108 examines whether the identification information IDA0 of the content A0 which links the POP P2 and the POP P3 is embedded in the webpage W3A, the other webpage to be displayed along with the webpage W3A or the webpage capable of being transferred with the webpage W3A. Then, since the identification information IDA0 of the content A0 is embedded in the webpage W2 to be displayed along with the webpage W3A, the examination unit 108 determines that the second relation is satisfied on the content A1.

In the case of examining the second relation on the content A0 included in the POP P2, for example, the examination unit 108 may examine whether the identification information IDM of the content M which links the POP P1 and the POP P2 is embedded in the predetermined webpage. Instead, the examination unit 108 may examine whether the identification information ID3 of the POP P3 linked to the POP P2 via the content A0 is embedded in the predetermined webpage.

When at least either the first relation or the second relation is not satisfied on the first content, the usage managing server 100 determines that the content is utilized in an unauthorized manner, such as usage in part or usage with modifying the predetermined relativity of the content included in the package. Then, the usage managing server 100 notifies the administrator via the output unit 112 (S114).

On the other hand, when the first relation and the second relation are satisfied, the usage managing server 100 may end the examination and return to the process of step S102 so that the first relation and the second relation are examined on a newly selected first content.

Further, subsequent to the examination on the first content, the usage managing server 100 may examine the first relation and the second relation on the third content included in the second POP. Following description will be on the case of examining the first relation and the second relation on the third content being subsequent to the examination on the first content.

In this case, the selection unit 104 selects the third content included in the second POP. The selection unit 104 may select the second content as the third content or another content out of the contents included in the second POP.

After the third content is selected, the specifying unit 106 specifies the second webpage which includes the third content. The examination unit 108 examines a predetermined webpage which is at least either the second webpage or one or more webpages linked to the second webpage. The examination unit 108 examines whether the second POP and one or more contents included in the second POP satisfy the first relation. Then, the examination unit 108 examines whether the second POP and the third POP linked via the third content satisfy the second relation. Since the procedure to examine the third content is similar to the procedure to examine the first content, description will not be repeated.

For example, in the case of the package of FIG. 9, the selection unit 104 selects the second content (i.e., the content A0 included in the POP P2) as the third content. Then, the examination unit 108 examines whether the identification information IDA0, IDB0, IDC0, and IDD0 of the contents A0, B0, C0, and D0 included in the POP P2 is embedded in the webpage W2 or other one or more webpages to be displayed along with the webpage W2. Then, since identification information IDA0, IDB0, IDC0, and IDD0 of the contents A0, B0, C0, and D0 is embedded in the webpage W2, the examination unit 108 determines that the first relation is satisfied on the content A0.

The examination unit 108 examines whether the identification information IDM of the content M which links the POP P1 and the POP P2 is embedded in the webpage W2, the other webpage to be displayed along with the webpage W2 or the webpage capable of being transferred with the webpage W2. Then, since the identification information IDM of the content M is embedded in the webpage W1 capable of being transferred to the webpage W2, the examination unit 108 determines that the second relation is satisfied on the content A0.

When at least either the first relation or the second relation is not satisfied on the third content, the usage managing server 100 determines that the content is utilized in an unauthorized manner. On the other hand, when the first relation and the second relation are satisfied, the usage managing server 100 may end the examination or examine the first relation and the second relation on the fourth content being subsequent to the examination on the third content.

By performing the examination on the third content being subsequent to the examination on the first content, the unauthorized usage of the content can be efficiently specified on the webpage related to the first webpage which includes the first content.

The above description is on the case that the usage managing server 100 examines the identification information of the content. However, the usage managing server 100 may examine the related information of the content as well as the identification information of the content. The case that the usage managing server 100 examines the related information of the content will be described as below.

In this case, the memory unit 102 stores a predetermined relation between the POP and the related information related to one or more contents included in the POP (i.e., the third relation) and a predetermined relation between the POPs linked to each other via the related information of the content (i.e., the fourth relation). The memory unit 102 stores the related information of one or more contents included in the POP to be related to the POP. Further, the memory unit 102 stores the related information of the content which links the POP and the other POP to be related to the POP or the other POP.

The specifying unit 106 specifies the first webpage which includes the related information of the first content. The specifying unit 106 may specify the first webpage in which the related information of the first content is embedded. The specifying unit 106 accesses one or more webpages related to other EC dealers via the communication network 4 and specifies the first webpage in which the text information corresponding to the related information of the first content is embedded.

The examination unit 108 examines whether the first POP and the related information of one or more contents included in the first POP satisfy the third relation. Then, the examination unit 108 examines whether the first POP and the second POP linked via the related information of the second content satisfy the fourth relation.

Here, the examination unit 108 may examine whether the related information of one or more contents included in the first POP is embedded in the first webpage or other one or more webpages to be displayed along with the first webpage. Further, the examination unit 108 may examine whether the related information of the second content which links the first POP and the second POP is embedded in the first webpage, the other webpage to be displayed along with the first webpage or the webpage capable of being transferred with the first webpage.

For example, in the case of the package of FIG. 9, the examination unit 108 examines whether the related information RA1 to RA3 of the contents A1 to A3 included in the POP P3 is embedded in the webpage W3A or other one or more webpages to be displayed along with the webpage W3A. Then, since the related information RA1 to RA3 of the contents A1 to A3 is embedded in the webpage W3A, the examination unit 108 determines that the third relation is satisfied on the related information RA1 of the content A1.

Then, the examination unit 108 examines whether the related information RA0 of the content A0 which links the POP P2 and the POP P3 is embedded in the webpage W3A, the other webpage to be displayed along with the webpage W3A or the webpage capable of being transferred with the webpage W3A. Then, since the related information RA0 of the content A0 is embedded in the webpage W2 to be displayed along with the webpage W3A, the examination unit 108 determines that the fourth relation is satisfied on the related information RA1 of the content A1.

Even if the unauthorized usage may not be specified based on the first relation and the second relation of the content, the unauthorized usage can be specified based on the third relation and the fourth relation of the related information of the content by examining the related information of the content. For example, even if an unauthorized entity takes action to prevent one's unauthorized usage from being specified, the unauthorized usage can be specified based on the third relation and the fourth relation of the related information of the content instead of the content.

In addition, by examining the related information of the content, it is possible to determine the status of the unauthorized usage of the content. For example, when the content is an image of an item and the related information of the content is advertisement information of the item, it is possible to determine whether the content is utilized in an unauthorized manner for a commerce purpose.

[4-3. Specific Example of Content Usage Managing Method]

Figure 12:
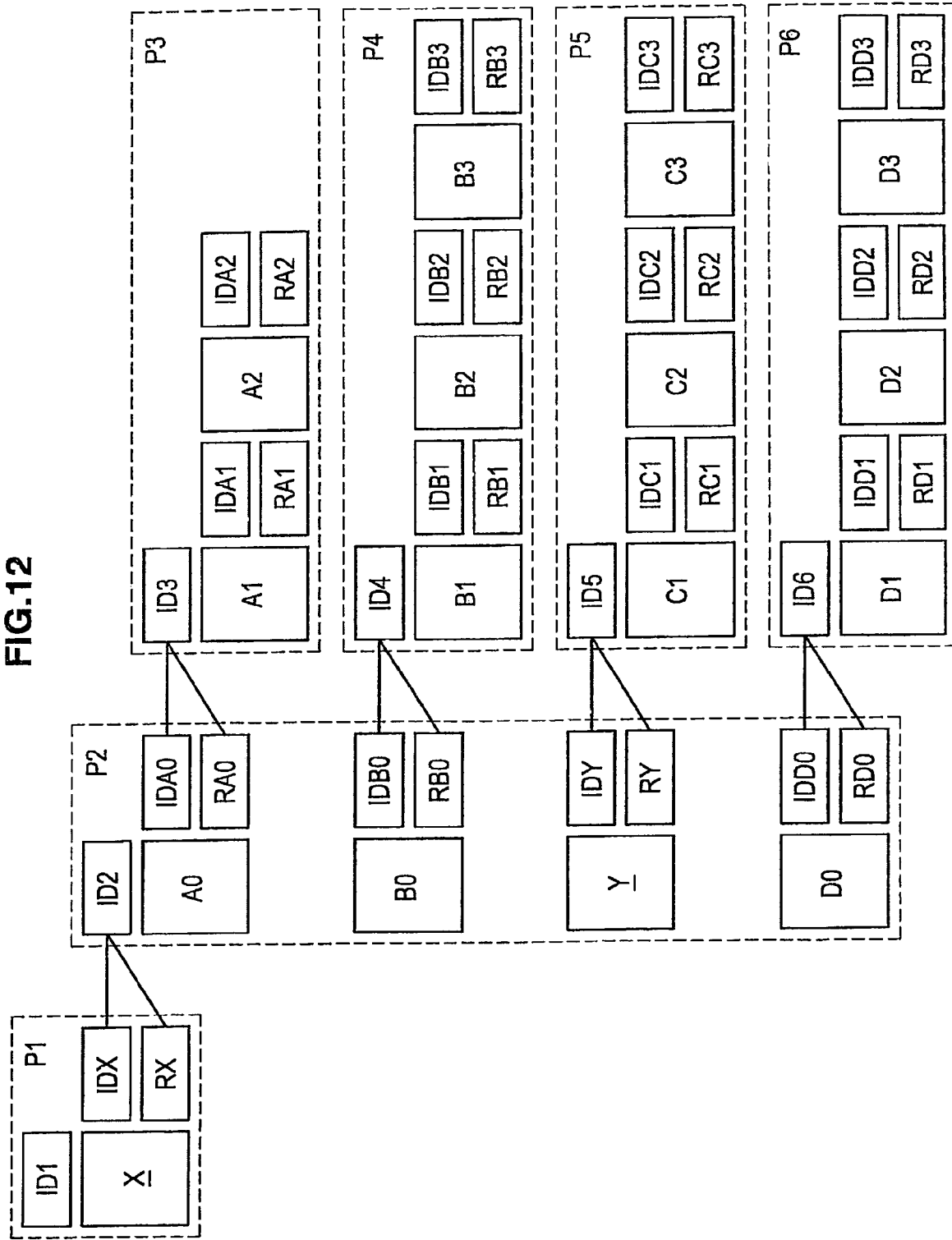
FIG. 12 is a view which illustrates an example of the data structure of a package including unauthorized usage of the content.
Figure 13:
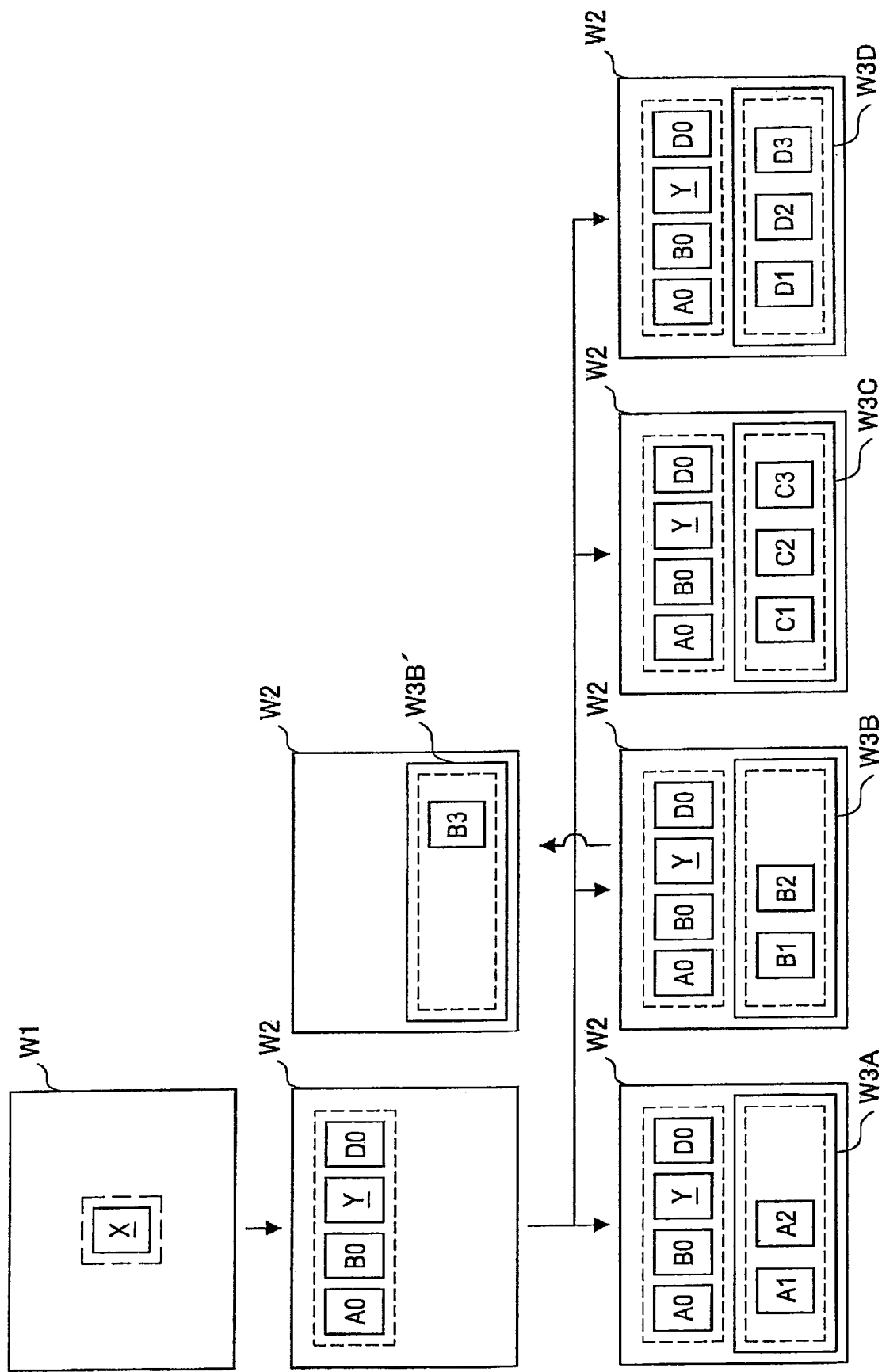
FIG. 13 is a view which illustrates display transition of the contents included in the package of FIG. 12.

Next, a specific example of the content usage managing method will be described with reference to FIGS. 12 and 13. FIG. 12 is a view which illustrates an example of the data structure of the package including unauthorized usage of the content. FIG. 13 is a view which illustrates display transition of the content included in the package of FIG. 12.

In the package illustrated in FIGS. 12 and 13, the content M is changed to a content X and the content A3 of the POP P3 is deleted from the package illustrated in FIG. 9. In addition, the display format of the contents B1 to B3 of the POP P4 is changed and the linkage destination of the POP P5 is changed from the content C0 to a content Y. Here, the POPs P1 to P6 and the contents A0 to A2, B0 to B3, C1 to C3, D0 to D3, X, and Y are related as similar to the case of FIG. 9.

It is assumed that the content A1 is selected as the first content. In this case, the identification information IDA3 of the content A3 included in the same POP P3 as the content A1 is not embedded in the webpage W3A or the webpage W2 to be displayed along with the webpage W3A. Accordingly, since the first relation is not satisfied on the content A1, it is specified as an unauthorized usage of the content.

It is assumed that the content B1 is selected as the first content. In this case, the identification information IDB3 of the content B3 included in the same POP P4 as the content B1 is embedded in a webpage W3B' capable of being transferred from the webpage W3B. Accordingly, since the first relation is not satisfied on the content B1, it is specified as the unauthorized usage of the content.

It is assumed that the content C1 is selected as the first content. In this case, the identification information IDC1 to IDC3 of all of the contents C1 to C3 included in the same POP P5 as the content C1 is embedded in the webpage W3C. Accordingly, the first relation is satisfied on the content C1.

However, the identification information of the content C0 which links the POP P2 and the POP P5 is not embedded in a webpage W3C which displays the content C1 or the webpage W2 capable of being transferred with the webpage W3C. Accordingly, since the second relation is not satisfied, on the content C1, it is specified as the unauthorized usage of the content.

It is assumed that the content D1 is selected as the first content. In this case, the identification information IDD1 to IDD3 of all of the contents D1 to D3 included in the same POP P6 as the content D1 is embedded in a webpage W3D. Further, the identification information IDD0 of the content D0 which links the POP P2 and the POP P6 is embedded in the webpage W2 to be displayed along with the webpage W3D which displays the POP P6. Accordingly, the first relation and the second relation are satisfied on the content D1.

Subsequent to the examination of the content D1, it is assumed that the content D0 included in the POP P2 is selected as the third content. The POP P2 is assumed to include the contents A0, B0, C0, and D0. In this case, the identification information IDA0, IDB0, IDC0, and IDD0 of all of the contents A0, B0, C0, and D0 included in the same POP P2 as the content D0 is embedded in the webpage W2 to be displayed along with the webpage W3D which displays the POP P6. Accordingly, the first relation is satisfied on the content D0.

However, the identification information IDM of the content M which links the POP P1 and the POP P2 is not embedded in the webpage W2 which displays the POP P2, the webpages W3A to W3D to be displayed along with the webpage W2 or the webpage W1 capable of being transferred to the webpage W2. Accordingly, since the second relation is not satisfied on the content D0, it is specified as the unauthorized usage of the content.

[5. Hardware Configuration of Content Usage Managing Server 100]

Figure 14:
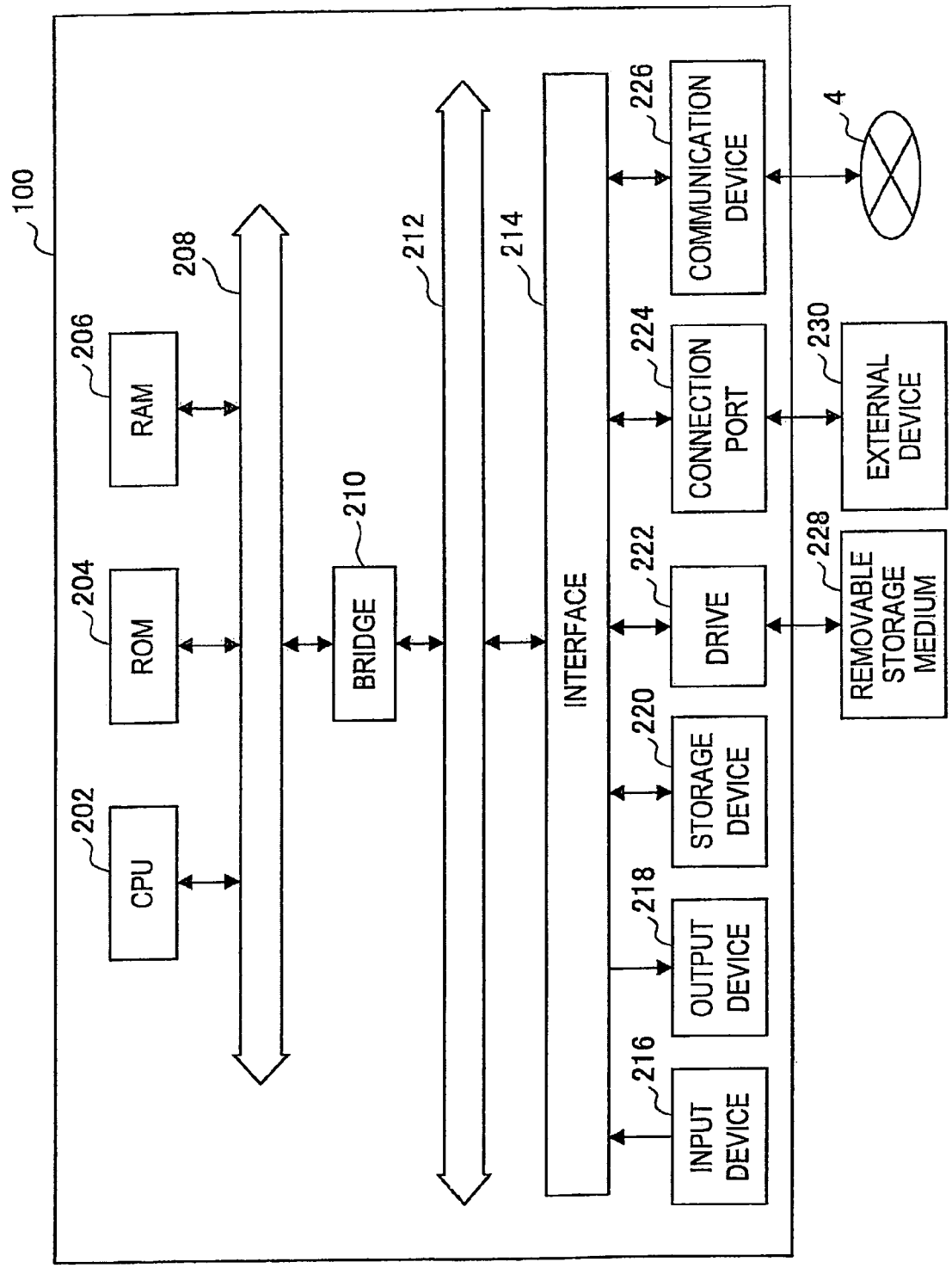
FIG. 14 is a block diagram which illustrates an example of the hardware configuration of the content usage managing server.

Next, the hardware configuration of the content usage managing server 100 according to an embodiment of the present invention will be described with reference to FIG. 14. FIG. 14 is a block diagram which illustrates an example of the hardware configuration of the content usage managing server 100.

The usage managing server 100 is configured to mainly include a CPU 202, a ROM 204, a RAM 206, a host bus 208, a bridge 210, an external bus 212, an interface 214, an input device 216, an output device 218, a storage device 220, a drive 222, a connection port 224 and a communication device 226.

The CPU 202 functions as an arithmetic processing unit and a control unit. The CPU 202 controls operation of the usage managing server 100 at least in part according to various programs stored in the ROM 204, the RAM 206, the storage device 220 or a removal storage medium 228. The ROM 204 stores a program, a parameter and the like for the CPU 202. The RAM 206 temporally stores a program to be executed by the CPU 202, a parameter for the execution of the program and the like. The CPU 202, the ROM 204 and the RAM 206 are connected from one another by the host bus 208. The host bus 208 is connected to the external bus 212 via the bridge 210.

The input device 216 is operation means capable of being operated by a user, such as a mouse, a keyboard, a touch panel, a button and a switch, for example. Further, the input device 216 may be remote control means utilizing radio waves such as infrared light, for example. The input device 216 may also be an external device 230, such as a cellular phone and a PDA, which supports the operation of the usage managing server 100. The input device 216 is configured to include an input control circuit and the like generating an input signal based on the operation information inputted by the user with the abovementioned operation means, for example, and outputting to the CPU 202. The user of the usage managing server 100 instructs process operation by inputting various data to the usage managing server 100 with operating the input device 216.

The output device 218 is configured to include a device capable of providing the obtained information to the user in a visual or auditory manner. For example, the output device 218 is a display device such as a CRT display, a liquid-crystal display and a lamp, an audio output device such as a speaker and a headphone, a printer, a cellular phone, a facsimile machine and the like. The output device 218 outputs a processing result of the usage managing server 100. For example, the display device displays the processing result of the usage managing server 100 as text information or image information. The audio output device outputs an audio signal such as reproduced audio data and sound data after converting into an analog signal.

The storage device 220 is a data storing device which is configured as an example of the memory unit of the usage managing server 100. For example, the storage device 220 includes a magnetic memory device such as an HDD, a semiconductor memory device, an optical memory device, an optical magnetic memory device or the like. The storage device 220 stores a program to be executed by the CPU 202, various data, externally-obtained various data and the like.

The drive 222 is a storage medium reader/writer to be mounted to the usage managing server 100 integrally or externally. The drive 222 reads stored data from the placed removal storage medium 228 such as a magnetic disk, an optical disk, an optical magnetic disk and a semiconductor memory and outputs to the RAM 206. The drive 222 also writes data for storing at the removal storage medium 228.

The connection port 224 is a port, such as a USB port, an SCSI port and an RS232C port, for example, to connect the external device 230 directly to the usage managing server 100. The usage managing server 100 obtains and provides data via the connection port 224 with the external device 230 which is connected to the connection port 224.

The communication device 226 is a communication interface configured with a communication device and the like for connecting to the communication network 4. For example, the communication device 226 is a wired or wireless LAN, a communication card for WUSB, a router for ADSL, a communication modem or the like. For example, the communication device 226 sends and receives a signal and the like with the Internet or another communication device according to a predetermined protocol. The communication network 4 connected to the communication device 226 is configured with a network and the like which is connected in a wired or wireless manner. The communication network 4 may be the internet, a home LAN, infrared light communication, radio wave communication, satellite communication or the like, for example.

The above description is on an example of the hardware configuration to actualize functions of the usage managing server 100 according to an embodiment of the present invention. Each of the structural elements of the abovementioned hardware may be configured with a general device or a specialized device for the function of each structural element.

[6. Summary]

As described above, with the content usage managing method according to the present embodiment, it is examined whether the first POP and one or more contents included in the first POP satisfy the first relation, and then, it is examined whether the first POP and the second POP linked via the second content satisfy the second relation, on at least any one of the first webpage or one or more webpages linked to the first webpage.

Since the specific service provider utilizes the package in compliance with the usage rules of the package, the predetermined relativity of the content included in the package is maintained. On the other hand, since the other service provider utilizes the content included in the package in part or with modifying the predetermined relativity despite of the usage rules of the package, the predetermined relativity of the content included in the package is not maintained. Therefore, by examining unsatisfactory of at least either the first relation or the second relation, the webpage related to the service provider can be specified as unauthorized usage of the content. In this manner, unauthorized usage of the content can easily be specified without performing the detection process of the hidden information on the contents respectively one by one.

In particular, the more the contents are included in the package, the more effectively the unauthorized usage of the content can be specified. Further, the more frequently the relativity among the contents included in the package is changed, the more it becomes difficult for an unauthorized entity to take action to prevent one's unauthorized usage from being specified. Accordingly, it becomes easy to specify the unauthorized usage.

Further, it is examined whether the predetermined relativity of the content included in the content group is maintained by utilizing the content identification information, and then, the unauthorized usage of the content is specified. Accordingly, even if most of the identification information of the content included in the content group is deleted or changed, the unauthorized usage of the content can be specified by examining whether the predetermined relativity of the content is maintained as long as at least single identification information exists without being changed.

It should be understood by those skilled in the art that various modifications, combinations, sub-combinations and alterations may occur depending on design requirements and other factors insofar as they are within the scope of the appended claims or the equivalents thereof.

What is claimed is:

1. A content usage managing apparatus, comprising:
    a memory unit which stores a first relation between a POP and one or more contents included in the POP and a second relation between two or more POPs linked via a content in a package (content group) which includes the two or more POPs;
    wherein each POP of the two or more POPs is a content subgroup;
    a selection unit which randomly selects a first content out of contents included in a randomly selected first POP of the package;
    a specifying unit which specifies a first webpage including the first content; and
    an examination unit which examines whether the first POP and one or more contents included in the first POP satisfy the first relation and examines whether the first POP and a second POP linked to the first POP via a second content satisfy the second relation,
    wherein to examine whether the first relation is satisfied the examination unit obtains information of the first POP and identification information of the contents included in the first POP and examines whether identification information for all of the contents included in the first POP is included in a predetermined webpage of the first webpage or one or more web pages linked to the first webpage, and
    wherein to examine whether the second relation is satisfied the examination unit obtains information of the first POP and the second POP and examines whether identification information of the second content is included in the first webpage, a second webpage to be displayed along with the first webpage, or a third webpage capable of being transferred with the first webpage.

2. The content usage managing apparatus according to claim 1,
    wherein the memory unit stores identification information of one or more contents included in the POP to be related to the POP and stores identification information of a content which links the POP and another POP to be related to the POP or the other POP; and
    the specifying unit specifies the first webpage in which identification information of the first content is embedded.

3. The content usage managing apparatus according to claim 1, in a case that the first relation and the second relation are satisfied on the first content,
    wherein the selection unit further selects a third content which is included in the second POP;
    the specifying unit further specifies a second webpage which includes the third content; and
    the examination unit further examines whether the second POP and one or more contents included in the second POP satisfy the first relation and examines whether the second POP and a third POP linked to the second POP via the second content satisfy the second relation, on at least any one of the second webpage or one or more web pages linked to the second webpage.

4. The content usage managing apparatus according to claim 1,
    wherein the memory unit further stores a third relation between the POP and related information related to one or more contents included in the POP and a fourth relation between the POPs linked via related information of a content; and
    the examination unit further examines whether the first POP and related information of one or more contents included in the first POP satisfy the third relation and examines whether the first POP and the second POP linked to the first POP via the second content satisfy the fourth relation, on at least any one of the first webpage or one or more web pages linked to the first webpage.

5. A content usage managing method to perform content usage management with a computer, comprising the steps of:
    storing a first relation between a POP and one or more contents included in the POP and a second relation between two or more POPs linked via a content in a package (content group) which includes the two or more POPs;

wherein each POP of the two or more POPs is a content subgroup;

randomly selecting a first content out of contents included in a randomly selected first POP of the package;

specifying a first webpage including the first content; and examining whether the first POP and one or more contents included in the first POP satisfy the first relation and examining whether the first POP and a second POP linked to the first POP via a second content satisfy the second relation, wherein for examining whether the first relation is satisfied the examining step comprises obtaining information of the first POP and identification information of the contents included in the first POP and examining whether all of the identification information for the contents included in the first POP is included in a predetermined webpage of the first webpage or one or more web pages linked to the first webpage, and wherein for examining whether the second relation is satisfied the examining step comprises obtaining information of the first POP and the second POP and examining whether identification information of the second content is included in the first webpage, a second webpage to be displayed along with the first webpage, or a third webpage capable of being transferred with the first webpage.

6. A non-transitory computer-readable medium having stored thereon a computer-readable program for causing a computer to execute a content usage managing method which comprises the steps of:

storing a first relation between a POP and one or more contents included in the POP and a second relation between two or more POPs linked via a content in a package which includes the two or more POPs;

wherein each POP of the two or more POPs is a content subgroup;

randomly selecting a first content out of contents included in a randomly selected first POP of the package;

specifying a first webpage including the first content; and examining whether the first POP and one or more contents included in the first POP satisfy the first relation and examining whether the first POP and a second POP linked to the first POP via a second content satisfy the second relation, wherein for examining whether the first relation is satisfied the examining step comprises obtaining information of the first POP and identification information of the contents included in the first POP and examining whether all of the identification information for the contents included in the first POP is included in a predetermined webpage of the first webpage or one or more web pages linked to the first webpage, and wherein for examining whether the second relation is satisfied the examining step comprises obtaining information of the first POP and the second POP and examining whether identification information of the second content is included in the first webpage, a second webpage to be displayed along with the first webpage, or a third webpage capable of being transferred with the first webpage.

* * * * *